Figure 1:
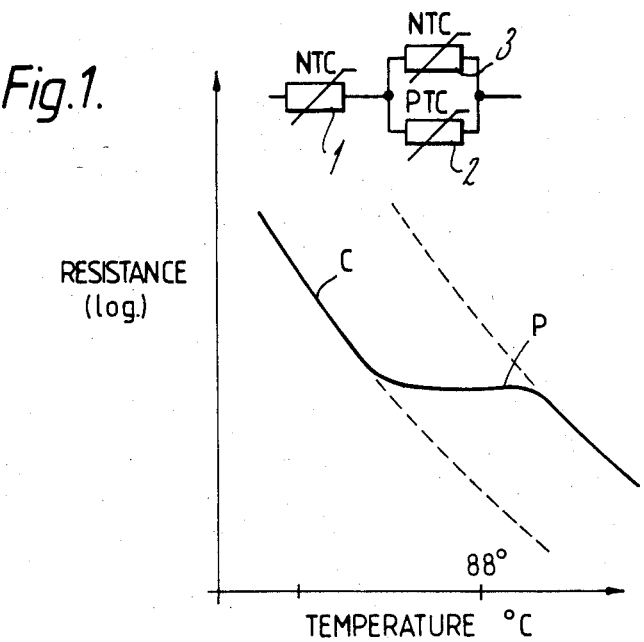

United States Patent [19]

Camp et al.

[11] Patent Number: 4,702,619
[45] Date of Patent: Oct. 27, 1987

[54] TEMPERATURE SENSORS

[75] Inventors: Philip G. Camp; Eric D. Macklen; Victor H. R. Hole; David R. Hutcherson, all of Somerset, England

[73] Assignee: Standard Telephones and Cables Public Limited Company, London, England

[21] Appl. No.: 808,363

[22] Filed: Dec. 12, 1985

Related U.S. Application Data

[63] Continuation of Ser. No. 568,404, Jan. 5, 1984, abandoned.

[30] Foreign Application Priority Data

Mar. 22, 1983 [GB] United Kingdom ................ 8307913

[51] Int. Cl.$^4$ ........................ G01K 13/00; G01K 7/22; G01D 13/22
[52] U.S. Cl. .................................... 374/144; 374/185; 116/303
[58] Field of Search .......................... 338/22 R, 23, 24; 374/144, 145, 185; 340/57, 594, 595, 596; 116/303, 327, 328, DIG. 6, 294; 361/27

[56] References Cited

U.S. PATENT DOCUMENTS

| 1,493,318 | 5/1924 | Braun | 374/146 |
| 2,022,440 | 11/1935 | Slough | 374/144 |
| 2,835,885 | 5/1958 | Boddy | 374/144 |
| 3,262,314 | 7/1966 | Gregg | 374/145 |
| 3,365,618 | 1/1968 | Obenhaus | 338/22 R |
| 3,444,399 | 5/1969 | Jones | 338/23 |
| 3,673,538 | 6/1972 | Faxon | 338/25 |
| 3,728,702 | 4/1973 | Miyamoto et al. | 340/595 |
| 3,890,588 | 6/1975 | Kanaya et al. | 338/28 |
| 4,357,590 | 11/1982 | Belhomme | 338/23 |

FOREIGN PATENT DOCUMENTS

| 747828 | 4/1956 | United Kingdom | 374/146 |
| 956579 | 4/1964 | United Kingdom | 338/22 R |
| 956985 | 4/1964 | United Kingdom | . |
| 979510 | 1/1965 | United Kingdom | . |
| 1093073 | 11/1967 | United Kingdom | . |
| 1152829 | 5/1969 | United Kingdom | 338/22 R |
| 1356235 | 6/1974 | United Kingdom | 338/22 R |
| 1398705 | 6/1975 | United Kingdom | . |
| 1426569 | 3/1976 | United Kingdom | 338/22 R |
| 1489815 | 10/1977 | United Kingdom | . |

Primary Examiner—Charles Frankfort
Assistant Examiner—W. Morris Worth
Attorney, Agent, or Firm—Kerkam, Stowell, Kondracki & Clarke

[57] ABSTRACT

A temperature sensor for a motor vehicle comprises a composite of PTC and NTC thermistors (1, 2, 3) whose overall temperature characteristic (c) is negative with a plateau (P) centered on the normal working temperature (88° C.) to be sensed, so that tolerances in the sensing system and normal fluctuations of the working temperature will tend not to be registered by the vehicle temperature gauge. Thus only abnormal variations in temperature caused by a fault or overload condition will be indicated.

10 Claims, 22 Drawing Figures

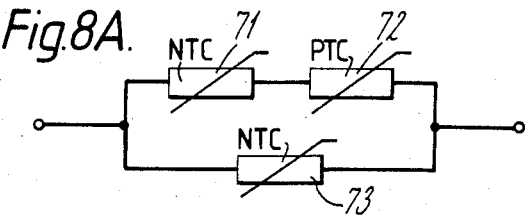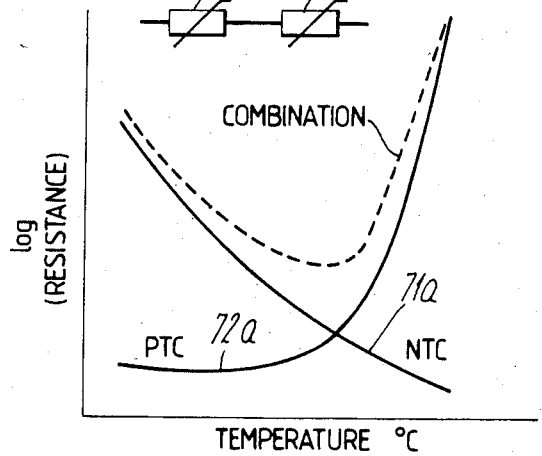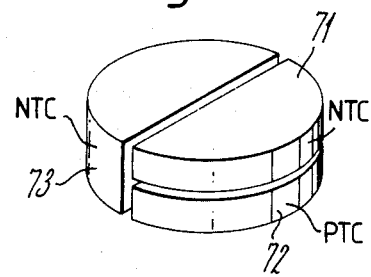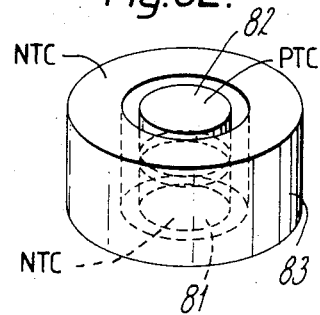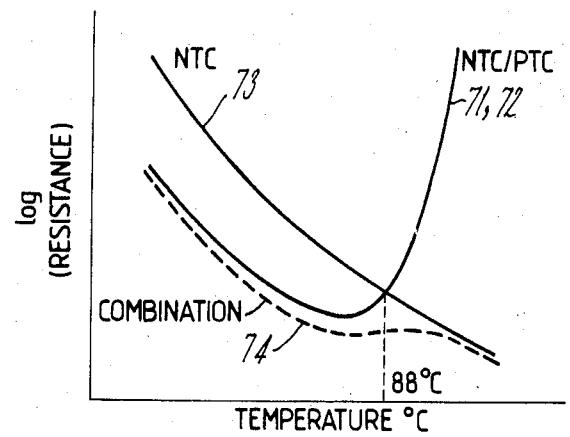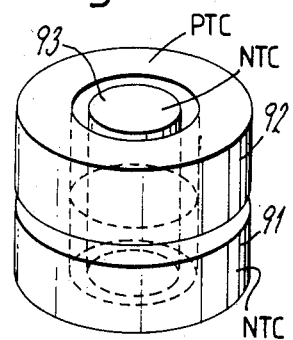

TEMPERATURE SENSORS

This is a continuation of copending prior application Ser. No. 568,404, filed Jan 5, 1984, and now abandoned.

This invention relates to thermistors for temperature sensing, particularly but not exclusively automotive engine temperature sensors.

Conventional automobile engines are water cooled and the water cooling system is arranged to operate under a pressure of between 5 and 15 lbs per square inch and at a temperature just below 90° C. A temperature sensor is used which senses the temperature of the cylinder block, which is very close to the water temperature, and which provides an electrical signal representative of temperature to provide an indication of the temperature on a temperature gauge or display on the vehicle dashboard.

Under normal conditions the temperature gauge displays a fluctuating reading, dependent upon factors such as ambient temperature, speed, load etc. Because of tolerances in the engine and cooling system, as well as the sensor and gauge system, the 'normal' temperature for a particular vehicle will vary widely. This has caused considerable concern to vehicle owners, leading to return of the vehicle under warranty. As the vehicle could genuinely be running at an abnormally high or low temperature it must be checked and this is costly.

According to one aspect of the present invention there is provided a temperature sensor whose resistance changes significantly with change of temperature except for a range of temperatures corresponding to a normal or expected operating temperature, and over this range the sensor resistance changes less, thus providing a plateau in the resistance/temperature characteristic, the sensor comprising thermistors in good heat transfer relationship with each other either directly or indirectly.

In a particular application the sensor is suitable for sensing the temperature of a vehicle engine, the predetermined temperature lying in the range 60° C. to 120° C., preferably 80° C. to 95° C.; typically the temperature is 88° C.

Preferably the device comprises a first NTC thermistor connected electrically in series with the parallel combination of a second NTC thermistor and a PTC thermistor, the three thermistors being in good heat transfer relationship with each other.

According to a further aspect of the present invention there is provided a temperature sender comprising a housing adapted to be secured to a device whose temperature is to be sensed, and a sensor as described in either of the three preceding paragraphs.

For some applications the sensor can comprise a second parallel combination of a third NTC and second PTC thermistor, the second combination being connected electrically in series with the series combination and in good thermal contact.

According to another aspect of the present invention there is provided a temperature sensing and indicating system comprising a sensor for sensing a predetermined temperature, and a display device for giving a temperature indication, the sensor comprising an NTC and a PTC thermistor combination having a plateau in its temperature characteristic to compensate for expected tolerances in the system and/or expected variations in the temperature whereby to prevent a changed indication which would otherwise be caused by such tolerances and/or variations.

Figure 2A:
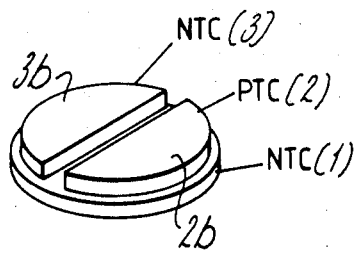
Figure 2B:
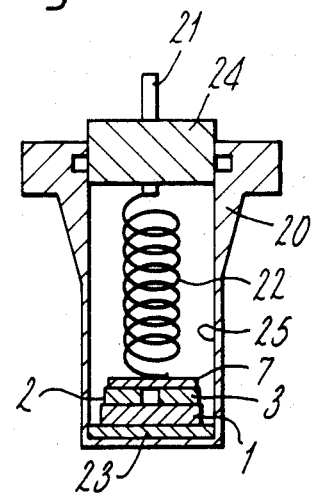
Figure 2C:
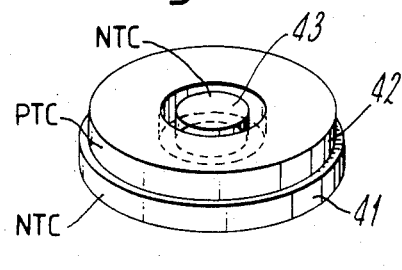
Figure 2D:
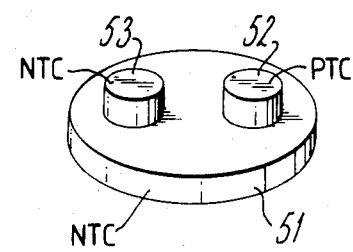
Figure 2E:
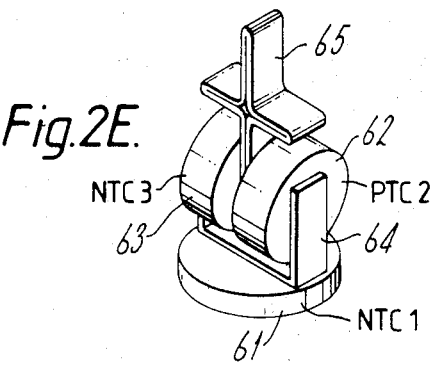
Figure 3:
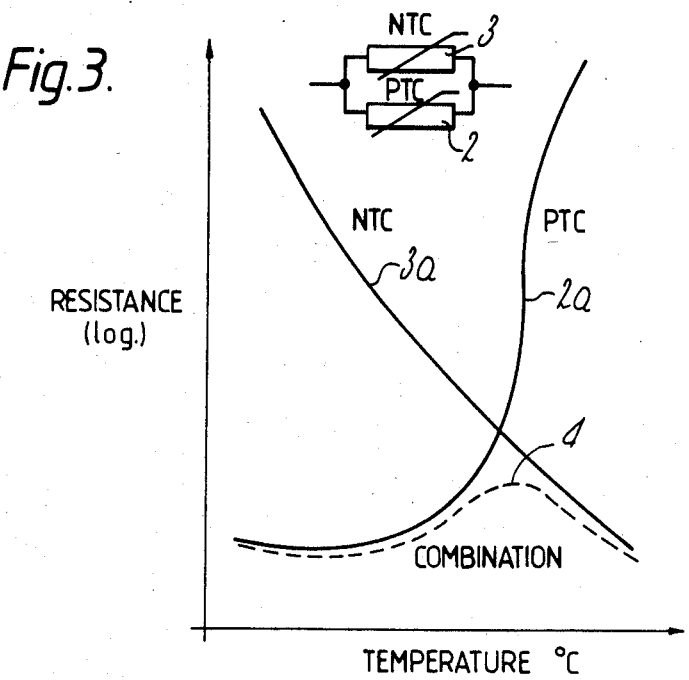
Figure 4:
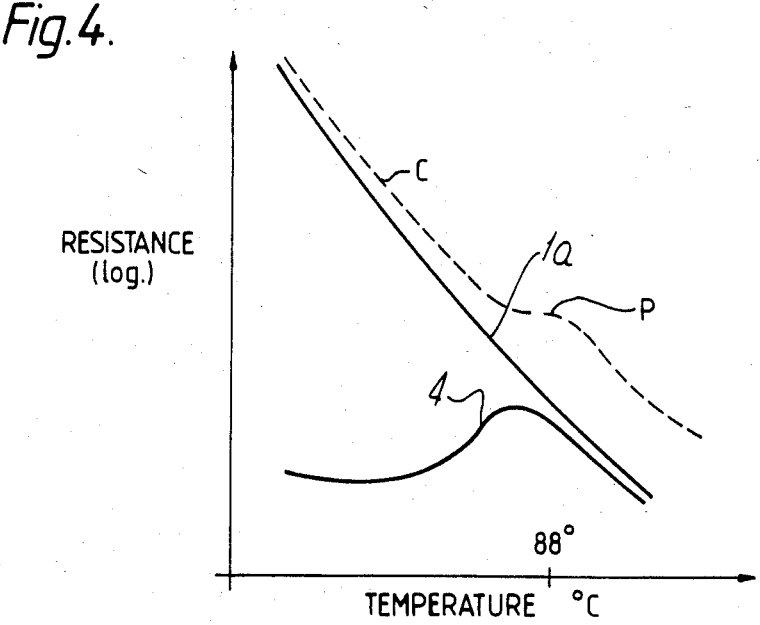
Figure 5:
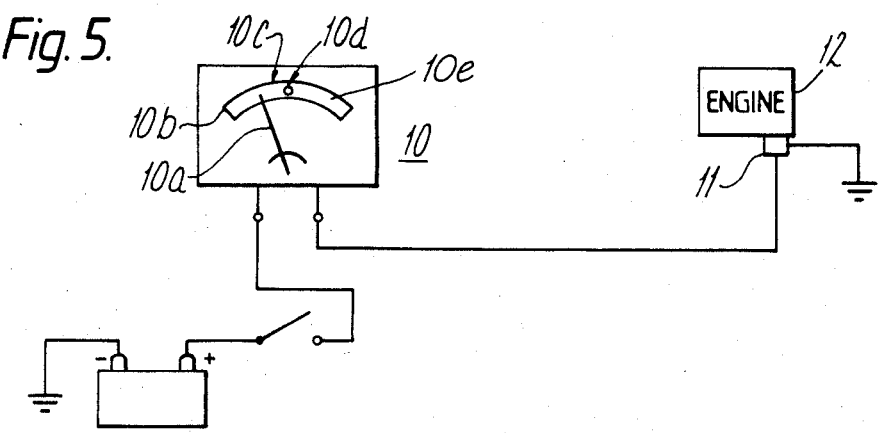
Figure 6:
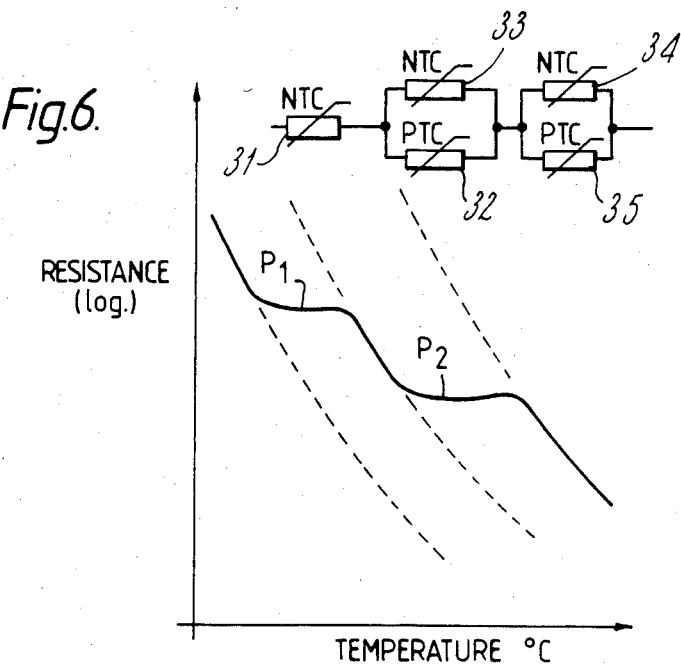
Figure 7:
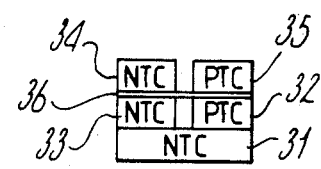
Figure 9:
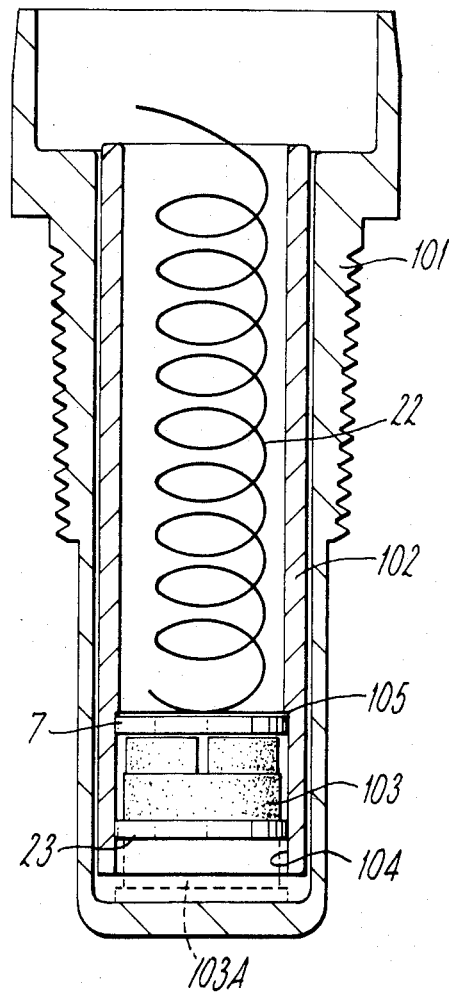

In order that the invention can be clearly understood reference will now be made to the accompanying drawings in which:

FIG. 1 shows diagramatically a thermistor composite for temperature sensing in an automotive engine, according to an embodiment of the present invention, together with the temperature characteristic, FIGS. 2A to 2E show various physical arrangements of the composite of FIG. 1, FIG. 3 shows the temperature characteristics of parts of the composite of FIGS. 1 and 2, FIG. 4 shows further temperature characteristics of parts of and the whole composite of FIGS. 1 and 2, FIG. 5 shows schematically a system for temperature sensing in an automotive engine employing a thermistor composite of FIGS. 1 and 2, FIG. 6 shows diagrammatically a thermistor composite according to a second embodiment of the invention and the temperature characteristic of it, FIG. 7 shows the complete composite of FIG. 6 in a physical arrangement, FIG. 8A shows a thermistor composite according to another embodiment of the invention, FIGS. 8B and 8C show the temperature characteristics of parts of and the whole of, respectively, the composite of FIG. 8A, FIGS. 8D, 8E and 8F show three different physical arrangements of the composite shown in FIG. 8A, FIG. 9 shows an engine temperature sender incorporating a thermistor composite according to an embodiment of the invention.

Figure 10:
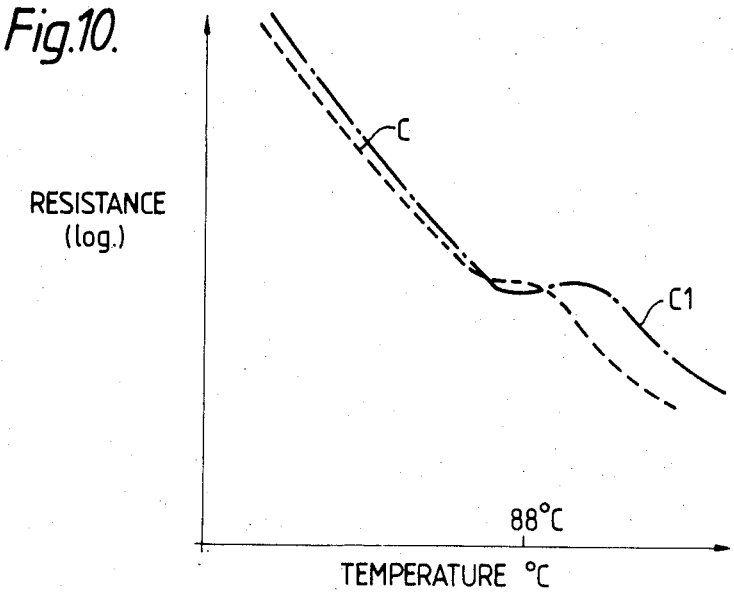
Figure 11A:
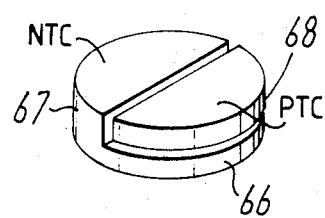
Figure 11B:
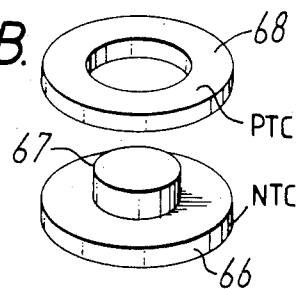
Figure 11C:
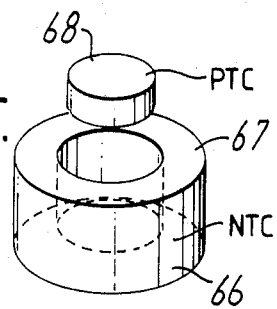

FIG. 10 shows the temperature characteristic of a thermistor composite according to an embodiment of the invention and explains the effect of self-heating, and FIGS. 11A, 11B, 11C show alternative physical arrangements of the composite of FIG. 8A.

Referring to FIG. 1, the thermistor composite suitable for engine temperature sensing comprises an NTC thermistor 1, and a parallel combination of a PTC thermistor 2 and a second NTC thermistor 3. The overall temperature characteristic is negative as shown in FIG. 1, the plateau P being caused by thermistors 2 and 3.

As shown in FIG. 3 thermistors 2 and 3 have positive and negative characteristics 2a and 3a, which combine to give an overall characteristic 4 shown in broken line.

The effect here and in the embodiment of FIGS. 6 and 7, is that as each PTC thermistor switches, its parallel NTC thermistor is brought into circuit, thereby changing the characteristic to a new curve.

Now, referring to FIG. 4 this characteristic 4 modifies the characteristic 1a of the NTC thermistor 1 to give the characteristic C with the plateau P, shown in broken line in FIG. 4 and full line in FIG. 1.

The plateau is centred on 88° C. which is the normal operating temperature of the vehicle engine. The edges of the plateau are situated at approximately 80° C. and 95° C. so that tolerances in the thermistor itself and in the system, and variations in temperatures above and below 88° C., caused e.g. ambient temperature (winter or summer), speed of the vehicle and load (e.g. towing a caravan) will not take the temperature of the thermistor device outside the range 80° C. to 95° C. Hence the temperature gauge in the vehicle will not register any change despite the tolerances and conditions described.

If however the engine temperature falls below or rises above the range 80° C. to 95° C. then this would arise from a fault condition or serious engine overload, and the temperature gauge will indicate the change.

An example of such a system is shown in FIG. 5. Referring to FIG. 5 a temperature gauge 10 for a vehicle is connected in series with a temperature sender 11 incorporating the thermistor composite of FIG. 2A mounted in an engine cylinder block 12. Power from the vehicle battery 13 via ignition switch 14 provides a current through the gauge 10 and the sensor 11. With the sensor cold the resistance is high as for example when the vehicle is first started. As the vehicle warms up the sensor resistance falls and more current passes through the gauge which in this embodiment is a bimetallic or moving iron device whose finger 10a moves as the current increases. As shown in FIG. 5 the indicator finger 10a has risen from the "COLD" end 10b of the scale 10c. When the engine reaches its normal running temperature of say 88° C. the finger 10a will point at the "NORMAL" mark 10d. Because of the plateau P in the sensor characteristic C shown in FIG. 1, the finger will continue to point at the "NORMAL" mark despite the tolerances and temperature fluctuations referred to earlier. If the engine overheats through loss of coolant or overloading and the temperature rises above 95° C., the finger will move towards the hot zone 10e, entering the red sector at 115° C. Alternatively if the engine thermostat fails the engine may never reach the normal operating temperature range (80° C. to 95° C.) and the finger will not reach the "NORMAL" mark 10d on the scale, also indicating a fault condition (less serious of course than the overheating fault condition).

Alternatively the gauge or display 10 could have a simple scale of temperature in e.g. degrees Centigrade, yet nevertheless make use of the present invention for the particular temperature, in this case 88° C.

A particular form of construction for the sensor of FIG. 1 is shown in FIG. 2A and comprises a thermistor composite in which the thermistors are disc thermistors thermally and electrically bonded together using solder. The NTC thermistor 3 and the PTC thermistor 2 are electrically connected across their exposed faces 2b and 3b by a lead disc 7 (shown in FIG. 2B and later in FIG. 9). FIG. 2B shows one example of a temperature sender for a motor vehicle. The composite is mounted in a screw threaded plug 20 with a connecting tag 21. The plug is screwed into an appropriate hole in the cylinder head of the engine 12, as depicted in FIG. 5. In more detail the thermistor composite is resiliently compressed by a spring 22 between the lead connecting disc 7 and a lead disc 23 seated in the base of the plug 20. An insulating member 24 carrying the tag 21 is secured in and closes off the open end of the hole 25 in the plug. The body of the plug acts as the earth connection, being connected to the thermistor composite through the lead disc 23.

FIG. 2C shows an alternative construction to that shown in FIG. 2A. Referring to FIG. 2C the composite comprises an NTC disc thermistor 41, a PTC "washer" shaped thermistor 42 with contact surfaces top and bottom and a second NTC disc thermistor 43 placed concentrically within the hole of thermistor 42. The unit is completed by means of a lead disc positioned both above and below this thermistor combination. In this format the unit is not soldered together as in FIG. 2A (although this could be employed if the mechanical contact proved inefficient) reliance being placed on spring 22 to provide pressure electrical and thermal contacts within the thermistor composite. The alternative, similar arrangement of a NTC washer with a small PTC disc placed in the hole is also envisaged as a practical solution in some cases. Otherwise the operation of the composite is the same as described with reference to FIG. 1.

A third form of construction is shown in FIG. 2D. Here the two half discs 2 and 3 of FIG. 2A are replaced by small NTC and PTC discs 52 and 53 soldered to the larger NTC disc thermistor 51, corresponding to thermistor 1 or 41 of FIGS. 2A or 2C. This gives all components a form which is easier for auto-testing before assembly, although it is not too efficient in the use of available surface area needed to achieve the low resistance required. It is a useful embodiment for higher resistance applications.

Yet another construction is shown in FIG. 2E. The NTC thermistor 61 corresponding to thermistors 1, 41 and 51 of previous embodiments has a U-shaped metal clip 64 connected to its upper surface by solder or by mechanical pressure from spring 22. Between the arms of the "U" are the NTC and PTC thermistors 62 and 63, corresponding to thermistors 2 and 3, 42 and 43, 52 and 53 of previous embodiments. The arms are sprung against the sides of thermistors and solder may or may not be required. A second metal clip 65 of cruciform shape has its sprung legs held between the inner faces of the thermistors, with or without solder.

All the arrangements described in FIGS. 2A, 2C, 2D and 2E are designed to be used in a temperature sender, basically as shown in FIG. 2B or in a modified version shown in FIG. 9 and to be discussed later.

Another embodiment of the present invention is shown in FIGS. 6 and 7. Referring to these figures the thermistor sensor comprises five disc thermistors, three NTC thermistors 31, 33 and 34 and two PTC thermistors 32 and 35. These thermistors are bonded together to form a unitary structure as shown in FIG. 7. A copper disc 36 is bonded in the interface between thermistors 32 and 33 on the one hand, and 34 and 35 on the other hand. Alternatively an unbonded lead disc 36 could be used.

A similar disc could be applied bonded or unbonded to the exposed faces of thermistors 34 and 35 for external connection to be made. The characteristic for this thermistor composite is shown in FIG. 6 and it has two plateaus P1 and P2 centered on two different temperatures. For example plateau P1 could correspond to a "cold" condition in a system whereas plateau P2 corresponds to a hot condition, in each case the plateau having the compensation effect described earlier so that false or misleading conditions by an indicator are not given.

In the embodiment described, or in other embodiments and applications which can be readily appreciated, by selection of particular slope and resistance values for the NTC thermistors the plateau can be widened or narrowed and by selecting differing switch points and resistances for the PTC thermistor(s) the position of the plateau can be changed. Low slope PTC thermistors and various other non-linear resistors can also be incorporated to modify the curve shape.

The mechanical arrangements for connecting—both thermally and electrically—described above are thought to be the best for the automotive environment, but various other methods will be possible and understood by those skilled in the art.

An alternative electrical format is shown in FIG. 8A. This format can give a similar resistance-temperature characteristic as the previously-described embodiments. NTC and PTC thermistors 71 and 72 (corresponding to thermistors 1 and 2 of FIG. 1) are connected in series and a third thermistor 73 which is an NTC thermistor, corresponding to thermistor 3 in FIG. 1, is connected in parallel with the series combination. For this format the series pair of 71 and 72 combine as shown in FIG. 8B and this connected in parallel with thermistor 74 combine to give the curve 74 shown in FIG. 8C. This final curve is very similar to the curve C of FIG. 4 with the plateau centered on the working normal engine temperature of 88° C. It differs in that the combination is always lower in resistance, particularly at higher temperatures, than NTC thermistor 3 of FIG. 1. This can be advantageous since this is the more critical part of the resistance-temperature curve for the application of vehicle engine temperature sensing.

The mechanical formats are shown in FIGS. 8D, 8E and 8F. FIG. 8D comprises half discs 71 and 72 soldered together and edgewise to half disc thermistor 73.

FIG. 8E comprises disc thermistors 81 and 82 (corresponding to 71 and 72) housed within a washer-shaped thermistor 83 (similar to 73).

FIG. 8F comprises two "washer"-shaped thermistors 91 and 92 (equals 81 and 82) housing a single disc NTC thermistor 93 (equals 83).

All three configurations would be sandwiched between a pair of lead discs such as 7 and 23 described with reference to FIG. 2B.

The embodiment described in FIGS. 2A, 2C, 2E and 8D, 8E and 8F can each be assembled without soldering the thermistor elements together. All the contact surfaces of the devices described in FIGS. 2A to 2E and FIGS. 8D to 8F would be silvered, or in the case of a PTC thermistor have an aluminium surface applied, but otherwise a purely mechanical assembly can be provided in a tubular insulating support, such as 102 to be described later with reference to FIG. 9, without soldering, relying on the pressure of a spring such as spring 22 in FIG. 2B, to make and maintain the necessary contacts inside the probe body plug 20 shown in FIG. 2B.

An example of a modified temperature sender is shown in FIG. 9. The screw threaded plug 101 contains a plastic tube 102 with the thermistor composite elements indicated generally by reference number 103 retained by lead washers 7 and 23 held by friction against the inside bore 104 of the tube, and a step 105 locating the thermistor composite just inside the lower end of the tube. The composite 103 can then be sold and transported as a sub-assembly within the tube 102 only, and finally assembled into body 101 elsewhere. When this is done and the spring 22 is applied, the composite 103 slides down, the spring pressure overcoming friction between the bore 104 and the lead washers 7 and 23 and the composite occupies the position shown in broken line and identified by reference numeral 103A. The top of the body 101 would then be closed with a cap 24 as indicated in FIG. 2B, with conductive lead out 21 from spring 22.

It is pointed out that the voltage applied to the measuring circuit may vary from a low, near zero value to the full battery value of 12 volts, depending on the precise circuit employed. For the higher applied voltages, self-heating of the thermistors will occur so that a temperature above the engine temperature will occur within the thermistor probe body. Thus the curve C shown in FIG. 10 in dashed line represents the response of the complete probe under higher applied voltage, i.e. with thermistor self-heating, whereas Curve C1 in FIG. 10 in dot-dashed line represents output from the same thermistor composite under low, near zero, applied voltage. This difference in thermistor output under different temperature indicating circuit conditions must be allowed for in the design of the NTC/PTC thermistor combination in order to provide correct engine temperature indication. The measuring circuit in different vehicles may vary considerably according to the type of indicating meter employed and the measuring voltage applied. To match these variations together with variations in the 'normal' operating temperature of different engines the resistance of the composite will vary widely as will the resistance and temperature range of the plateau for example between 10 ohms at the plateau and 500 ohms at the plateau. The term 'plateau' in this specification is meant to include also a "hump" in the characteristic, i.e. the plateau may not be quite flat necessarily.

Two examples of the variations in resistance and temperature range of composites required for different engines are as follows:

EXAMPLE 1

| Petrol engine 6 cylinder | |
| --- | --- |
| Resistance (ohms) | Temperature (probe) (°C.) |
| 112 | 120 |
| 170 | 104 |
| 170 | 96 |
| 240 | 80 |
| 630 | 60 |

EXAMPLE 2

| Diesel engine | |
| --- | --- |
| 30 | 110 |
| 60 | 90 |
| 60 | 75 |
| 85 | 60 |

In all the thermistor arrangements described the thermistors are in good heat transfer relationship with each other either directly through direct surface to surface contact with each other, or in the case of FIG. 2E indirectly through the intermediary of metal clip parts. However an arrangement could be envisaged where the good thermal transfer is provided by the casing and/or by an oil filling only.

It will also be appreciated by those skilled in the art that both the NTC thermistors could be formed from an integral thermistor element so shaped that, with the addition of the PTC thermistor element the effect of three thermistors, two NTC and one PTC can still be achieved from the combination.

Examples of this are shown in FIGS. 11A to 11C. In 11A NTC thermistors 66 and 67, corresponding to thermistors 1 and 3 in FIG. 1, are fabricated as an integral structure and so shaped ("L"-shaped in side view) that the PTC thermistor 68, corresponding to thermistor 2 in FIG. 1, can be used in the same way as the structure of FIG. 2A.

FIGS. 11B and 11C show similar integral structures for the two NTC thermistors for composite structures which have a washer shaped PTC and a small disc PTC respectively.

In general the normal operating temperature sensed for vehicle engines could be anywhere in the range 60° C. to 120° C. depending on the type of engine and the positioning of the sensor to the combustion chamber(s).

We claim:

1. A thermistor temperature sensor, for electrical connection to a temperature indicator, said indicator being capable of responding to thermistor resistance via said electrical connection to indicate temperatures sensed by the sensor, including a normal or expected operating temperature of a motor vehicle engine and temperatures below and temperatures above, respectively, the normal or expected operating temperature, said sensor having a resistance/temperature characterisitc curve comprising a first sloping portion representing changes is said sensor resistance in response to temperature changes below said normal or expected operating temperature. a second sloping portion representing changes in sensor resistance in response to temperature changes above said normal or expected operating temperature, the sensor resistance represented by said sloping portions changes significantly with changes of temperature, said characteristic curve also having has a plateau merging smoothly with one end of said first sloping portion and an opposite end of said second portion, said plateau extending over a range of temperatures corresponding to a range of normal engine temperature fluctuations said indicator providing a change in indication in response to temperature changes above and below said range of normal engine temperature fluctuations and remaining substantially unchanged in response to temperature changes within said range of normal engine temperature fluctuations, said sensor comprising both negative temperature coefficient and positive temperature coefficient thermistors in good heat transfer relationship with each other so that, in use, said sensor has a single resistance/temperature characteristic.

2. A sensor as claimed in claim 1 comprising a first NTC thermistor connected electrically in series with a parallel combination including a second NTC thermistor in parallel with a PTC thermistor.

3. A sensor as claimed in claim 2, characterized in that said parallel combination is located on one surface of said first NTC thermistor.

4. A sensor as claimed in claim 3, characterized in that said parallel combination comprises thermistors which are each part-disc shaped.

5. A sensor claimed in claim 3, characterized in that said parallel combination comprises thermistors which are located one inside the other.

6. A sensor as claimed in claim 1, comprising a first NTC thermistor connected electrically in parallel with a second NTC thermistor and a PTC thermistor in series combination.

7. A sensor as claimed in claim 1, wherein the normal or expected operating temperature is 88° C.

8. A temperature sensing and indicating system for a motor vehicle, said vehicle having an engine and said engine having a range of normal or expected operating temperature fluctuations when the vehicle is in use, said system comprising:
 a thermistor sensor electrically connected with a display device, said
 sensor sensing the vehicle engine temperature, and having a resistance/temperature characteristic curve; and
 said display device having an indicator capable of responding to thermistor resistance to give an indication of the engine temperature;
 said sensor comprising an NTC and a PTC thermistor combination having a plateau in said resistance/temperature characteristic curve intermediate two similarly sloped portions of said curve, said plateau extending over a range of temperatures corresponding to said range of normal operating engine temperature fluctuations whereby a change in indication by said indicator in response to changes of engine temperature below or above said range of normal operating temperature fluctuations is permitted and changes in indication by said indicator in response to changes of engine temperature within said range of normal operating temperature fluctuations is substantially limited.

9. A temperature sender for sensing the temperature of an internal combustion engine having a cylinder head, said engine having a range of normal or expected operating temperature fluctuations when in use, said sender comprising:
 a hollow-screw-threaded plug for screwing into an appropriate hole in the cylinder head;
 a thermistor composite for connection to a temperature indicating device having an indicator capable of responding to thermistor resistance, said composite having a resistance which varies significantly with temperature;
 a spring resiliently compressing the composite in the plug;
 an insulating member closing off the plug;
 a connection tag carried by the insulating member and providing a conductive lead from the spring; and
 the thermistor composite comprising thermistors in good heat transfer relationship with each other and having a resistance/temperature characteristic curve having a plateau extending over a range of temperatures corresponding to said range of expected or normal engine temperature fluctuations whereby a change in indication by said indicator in response to changes in engine temperature below or above said range of normal operating temperature fluctuations is permitted and change in indication of said indicator in response to changes in engine temperature within said range of normal operating temperature fluctuations is substantially limited.

10. A temperature sensor for incorporation into a temperature sender body for sensing temperatures, said sensor comprising:
 a tube having a stepped bore;
 a composite of thermistor elements located by the step just inside an end of the tube and having a resistance which varies with temperature;
 the composite elements being held together and retained by washers held by friction against the inside bore of the tube; and
 the composite of elements electrically combining to provide a resistance/temperature characteristic curve having a plateau extending over a range of normal or expected operating temperatures corresponding to expected temperature fluctuations whereby the resistance of said composite elements varies with changes of temperature below or above said range of expected temperature fluctuations and the resistance of said composite elements remains substantially constant when changes of temperature are within said range of expected temperature fluctuations.

* * * * *